(No Model.)

O. P. ROSS.
FISHING REEL.

No. 468,180.   Patented Feb. 2, 1892.

Witnesses
Chas. H. Wideen
P. H. Lewthel

Inventor
Oliver P. Ross,
by R. F. Osgood,
Atty.

UNITED STATES PATENT OFFICE.

OLIVER P. ROSS, OF OLEAN, NEW YORK, ASSIGNOR TO THE WHITE-ROSS MANUFACTURING COMPANY, OF CARLISLE, PENNSYLVANIA.

FISHING-REEL.

SPECIFICATION forming part of Letters Patent No. 468,180, dated February 2, 1892.

Application filed March 26, 1891. Serial No. 386,474. (No model.)

*To all whom it may concern:*

Be it known that I, OLIVER P. ROSS, of Olean, in the county of Cattaraugus and State of New York, have invented a certain new and useful Improvement in Fishing Rods and Reels; and I do hereby declare that the following is a full, clear, and exact description of the same, reference being had to the drawings accompanying this specification.

This invention relates to a fishing-rod in which the spool that winds the line is driven by spring mechanism located inside the butt of the rod. Such devices are already known.

The invention consists of two or more spiral springs and connecting mechanism, combined, arranged, and operating as hereinafter more fully described.

Figure 1:
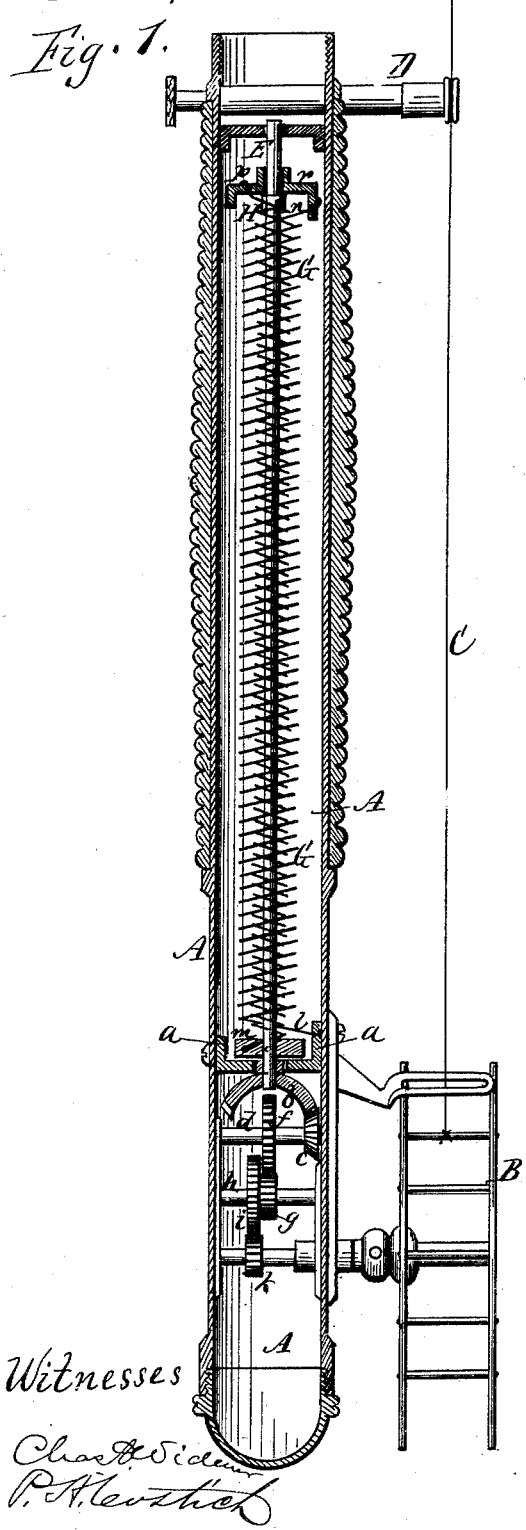
Figure 2:
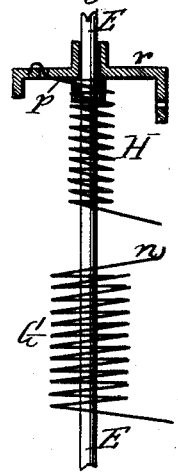
Figure 3:

In the drawings, Figure 1 is a central vertical section of the butt of a fishing-rod, showing my improvement applied thereto. Fig. 2 is a diagram showing an elevation of the upper end of the spindle, the loose disk resting thereon, and a portion of the two spiral springs. Fig. 3 is a plan view of the two springs and a cross-section of the spindle.

A indicates the butt of the fishing-rod, which is hollow, and is adapted to receive the first joint of the rod.

B is the winding-spool on the outside of the rod, and C the line attached thereto and passing through the brake or clamp D.

My improvement is as follows:

E is a spindle resting in fixed bearings $a$ $a$ at the top and bottom. This spindle is provided at the lower end with a bevel-gear $b$, which engages with a bevel-pinion $c$. On the shaft $d$ of the pinion is a spur-gear $f$, that engages with a spur-pinion $g$. On the shaft $h$ of this pinion is another spur-gear $i$, that engages with another pinion $k$, and the shaft of this pinion extends through the butt and carries the spool B. By this means the motions of the spool are multiplied. If desired to still increase the motion, a greater number of gears may be arranged in the same manner.

G and H are two spiral springs by which motion is imparted to the spindle. They are of considerable length, as shown, and surround the spindle, one spring being located inside the other. At the bottom the loose end $l$ of the outer spring G is attached to the fixed bearing $a$, while the corresponding loose end of the inner spring H is attached to a hub $m$, that is pinned to and turns with the spindle. At the top the two loose ends $n$ and $p$ of the springs are attached to the opposite sides of a disk $r$, that turns freely on the spindle. These two springs have the effect of a single spring of the length of the two, while they are shortened by the doubling, so that the butt is not of unusual length. A greater number of the springs might be used, but are unnecessary, as two springs of the length shown will wind one hundred and fifty feet of line.

To attach the line, the spool is turned till the springs are wound up. This turning action winds up the inner spring by its connection with the hub $m$, and the inner spring winds up the outer one by the connection of the two springs with the loose disk $r$. The resistance to the winding is produced by the attachment of the lower end of the outer spring to the fixed bearing $a$.

Having described my invention, I do not claim, broadly, springs inside the butt for operating the winding-spool.

What I claim as new and desire to secure by Letters Patent is—

1. In a fishing-rod, the combination, with the spindle that operates the gearing, of a set of spiral springs located one within another, surrounding the spindle, the lower ends connected, respectively, with the butt and the spindle and the upper ends with a device that turns freely on the spindle, as shown and described, and for the purpose specified.

2. In a fishing-rod, the combination of the spindle E, the springs G H, connected at the bottom, respectively, with the butt and the spindle, the disk $r$, turning loosely on the spindle, the ends of the springs being connected therewith, a gear-wheel on the lower end of the spindle, and gearing connecting said gear-wheel with the shaft of the winding-spool, as herein shown and described.

In witness whereof I have hereunto signed my name in the presence of two subscribing witnesses.

OLIVER P. ROSS.

Witnesses:
 GEORGE CRANNELL,
 CHAS. W. SMITH.